United States Patent [19]

Saito et al.

[11] 4,343,834
[45] Aug. 10, 1982

[54] PROCESS FOR PREPARING MAGNETIC RECORDING MEDIUM

[75] Inventors: Seitoku Saito; Toshiaki Izumi; Hiroshi Sugihara; Takayoshi Kobuke; Kazuo Takada, all of Tokyo, Japan

[73] Assignee: TDK Electronics Co., Ltd., Tokyo, Japan

[21] Appl. No.: 247,753

[22] Filed: Mar. 26, 1981

[30] Foreign Application Priority Data

May 26, 1980 [JP] Japan .................................. 55/68885

[51] Int. Cl.³ .............................................. B05D 5/12
[52] U.S. Cl. .................................... 427/132; 427/128; 427/251; 427/296
[58] Field of Search .............................. 427/127–132, 427/48, 251, 296

[56] References Cited

U.S. PATENT DOCUMENTS 4,220,117  9/1980  Shinohara ...................... 427/132 X Primary Examiner—Bernard D. Pianalto
Attorney, Agent, or Firm—Oblon, Fisher, Spivak, McClelland & Maier

[57] ABSTRACT

A magnetic recording medium is prepared by a tilt vapor deposition of magnetic particles from a vapor thereof on a substrate running along a peripheral surface of a cylindrical can in vacuum wherein plural cans are used to deposit said magnetic particles at substantially the same tilt angle on each of said cans.

1 Claim, 2 Drawing Figures

PROCESS FOR PREPARING MAGNETIC RECORDING MEDIUM

BACKGROUND OF THE INVENTION

1. Field of the Invention

The present invention relates to an improved process for preparing a thin metallic layer type magnetic recording medium by a tilt vapor deposition process.

2. Description of the Prior Art

Recently, high density recording of data has been remarkably required in development of magnetic recording media. The high density magnetic recording technology has been remarkably developed by improvements of a magnetic recording medium, a magnetic reproducing system, a running system, a magnetic head etc. Various studies are still continuing. Among these improvements, improvements of magnetic recording media are especially important as the fundamental matter. In the improvement, the required characteristics of the magnetic recording media are mainly an increase of coercive force, an increase of residual magnetic flux density, and a decrease of a thickness of a magnetic recording medium.

The conventional coating type magnetic recording media have been prepared by coating a magnetic paint comprising a magnetic powder and an organic binder on a substrate. Remarkable development for high density recording has been attained by using a metallic magnetic powder instead of iron oxide type magnetic powders as the magnetic powder. From a theoretical view-point, however, it is difficult to give a residual magnetic flux density of greater than 3,000–4,000 gauss because of the binder in such coating type magnetic recording media. Recently, metallic layer type magnetic recording media which do not contain an organic binder have been developed. The thin metallic layer type magnetic recording media have been prepared by forming a thin metallic layer on a substrate by forming metallic particles made of a metal or alloy of a iron group element by a vacuum evaporation, sputtering, ion-plating, ion beam evaporation or electrochemical method.

Among these methods, the vacuum evaporation method has been especially developed as the technology for preparing uniform, long magnetic recording media in an industrial scale, and the studies for this method has been in progress.

The following methods have been proposed to increase a coercive force and to improve squareness in the vacuum evaporation method.

(I) a tilt vapor deposition;
(II) a deposition in a magnetic field;
(III) a control by a selection of a material for a base; and
(IV) a crystalline growth by a heat treatment.

The tilt vapor deposition method (I) is especially superior in view of the improvement of magnetic characteristics.

The tilt vapor deposition method utilizes a phenomenon of uniaxial magnetic anisotropy resulted by depositing metallic particles by flowing a metallic vapor at a tilt angle to a surface of a substrate as disclosed in Japanese Examined Patent Publication No. 19389/1966. The tilt vapor deposition phenomenon is remarkably complex and the reason for the magnetic anisotropy has not been found. It has been considered to result the phenomenon by self shade effect, an acicular growth of crystals and a magnetic distortion effect etc.

In the conventional process for preparing a magnetic recording medium by a typical tilt vapor deposition, a substrate is taken out to run the substrate through a cylindrical can to a wind-up shaft and a metallic vapor flow from a metal evaporation source is fed at a tilt angle to the substrate during the running of the substrate along a part of the peripheral surface of the cylindrical can in the vacuum tank.

FIG. 1 is a schematic view of the process. In the vacuum tank, a substrate-feeding shaft, a wind-up shaft and a cylindrical can X are placed to provide the running system for the substrate (1). A magnetic metal evaporation source O is placed at the bottom of the vacuum tank to feed metallic vapor flow to the facing part of the cylindrical can X. The metallic vapor flow is fed at a tilt angle $\theta_1$ at the point A, and at a tilt angle $\theta_2$ at the point B. Between the points A and B, the tilt angles are continuously varied in a range of $\theta_1$ to $\theta_2$. The magnetic anisotropy of the magnetic layer is depending upon the tilt angle $\theta$ and accordingly, $\theta_1-\theta_2$ should be limited to certain ranges. The vapor deposited area is limited to the range between the point A and the point B. When the vapor deposited area is increased to the point C, the tilt angle $\theta_3$ for the point C is remarkably different from $\theta_1$, whereby the magnetic characteristic of the deposited metallic magnetic layer is inferior. Thus, the conventional tilt vapor deposition process has the disadvantage of low productivity.

SUMMARY OF THE INVENTION

It is an object of the present invention to provide a process for producing a magnetic recording medium by a tilt vapor deposition in an improved productivity and an improvement of quality.

The foregoing and other objects of the present invention have been attained by providing a process for producing a magnetic recording medium by a tilt vapor deposition on a substrate running along peripheral surfaces of plural cylindrical cans in vacuum to deposit magnetic particles at substantially the same tilt angle on each of said cans.

DETAILED DESCRIPTION OF THE PREFERRED EMBODIMENTS

The present invention is based on the consideration that the conditions for substantially the same tilt vapor depositions are attained on the substrate over each of the cylindrical cans by using plural cylindrical cans for the running system for the substrate in a vacuum tank and adjusting the relative arrangements of the positions of the cans to an evaporation source.

The plural cylindrical cans are placed to closely approach them to the perpendicular direction and to slightly shift in the horizontal direction to the common evaporation source, whereby substantial same conditions for tilt vapor depositions are attained on a part of each cylindrical can. Therefore, a thickness of the magnetic layer formed by the vapor deposition can be increased to improve the productivity in comparison with the conventional process using a single cylindrical can. Moreover, the conditions for the tilt vapor depositions on each of the cans, are limited to give limited tilt angle ranges whereby magnetic characteristics are improved as shown in the following examples. When the tilt angles of the vapor flow to the cans are limited to a desired range, the magnetic recording medium having improved magnetic characteristics can be obtained without decreasing the productivity.

Figure 1:
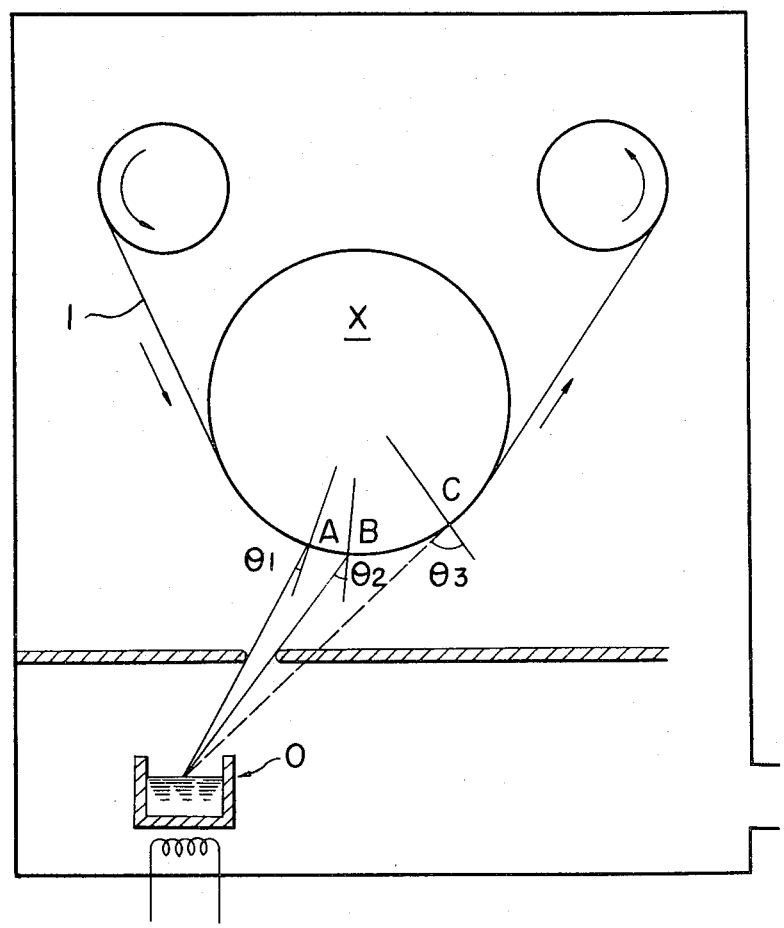
FIG. 1 shows a schematic view of an apparatus for a conventional typical tilt vapor deposition method.
Figure 2:
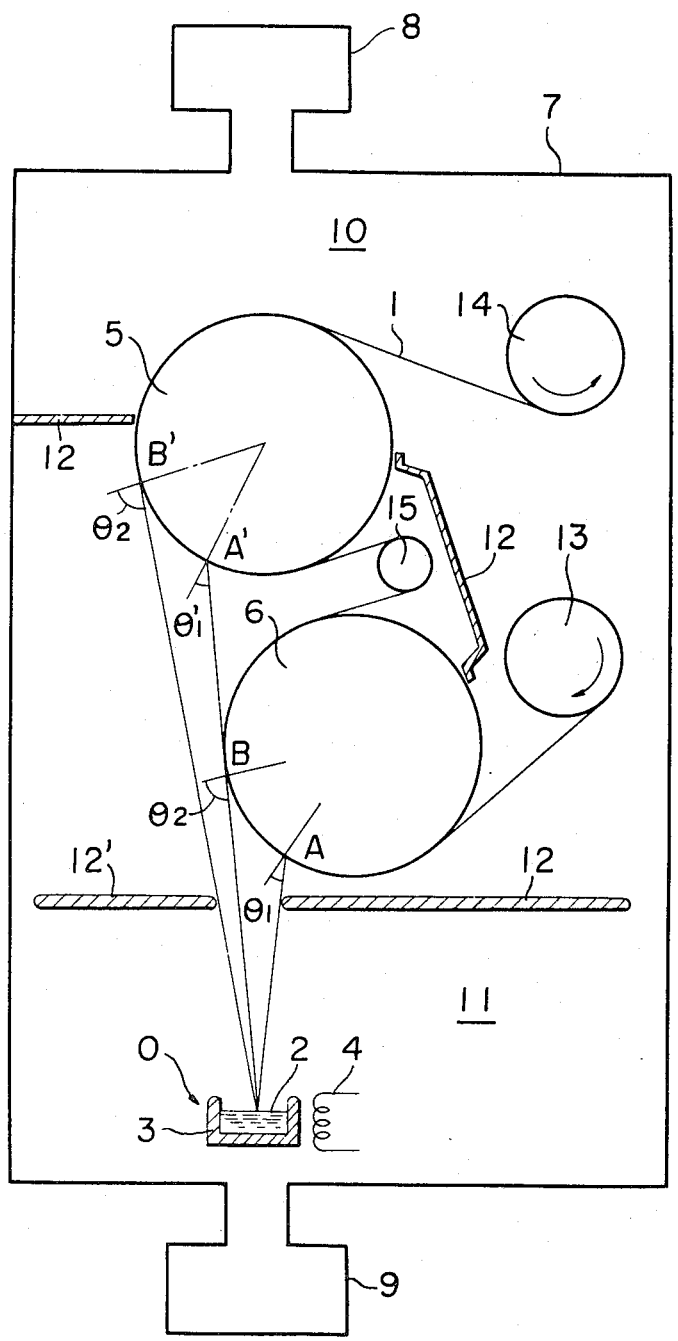
FIG. 2 shows a schematic view of an apparatus for one embodiment of a tilt vapor deposition method using two cylindrical cans according to the present invention.

FIG. 2 shows one embodiment of the present invention wherein two cylindrical cans are used. In the vacuum tank (7), the magnetic metal evaporation source O is placed at the bottom and the substrate-running system is placed above the evaporation source. The evaporation source system can be any conventional system. In this embodiment, an electron beam system is schematically shown. An evaporation base material (2) is charged in a water cooling copper vessel (3) and an electron generator (4) is actuated to generate accelerate electron beam which heat the evaporation base material (2) to vaporize the material.

The substrate-running system comprises a shaft for feeding-out (13), two cylindrical cans (5), (6), a guide roll (15) and a shaft for winding up (13). The substrate (1) is fed out from the shaft for feeding out (13) and is run along the peripheral surfaces of the cylindrical cans (6), (5) at a desired speed and is wound up on the shaft for winding up (14). The substrate-running system is not limited to the structure shown in FIG. 2. The shaft for winding up and the shaft for feeding out can be reversely used. The relative positions can be changed as desired. With regard to the running system, the conventional tensioning means and the conventional guiding means can be used without trouble if necessary. A vacuum tank (7) is divided into two chambers (10), (11) by a partition (12) and the cylindrical can. Usually, each of evacuating systems (8), (9) is connected to each of the divided chambers (10), (11).

The evaporation base material can be an iron group element such as iron, nickel and cobalt or an alloy thereof or an alloy with another element.

The substrate can be the conventional substrate for a magnetic recording medium which is made of polyethyleneterephthalate, other polyester etc.

The cylindrical can has effects not only for guiding and carrying the substrate but also cooling the substrate. A temperature of the cylindrical cans is usually maintained at about 50° to 100° C. with a vapor medium or a liquid medium.

The partition (12') is shiftable for controlling the vapor flow direction. The partition between the lower cylindrical can (6) and the evaporation source O can be a partition having a variable opening port.

In the apparatus having the above-mentioned structure, the metallic vapor flow generated from the evaporation source O is fed to the part between the points A and B of the lower cylindrical can (6) at tilt angles between $\theta_1$ to $\theta_2$. On the other hand, the metallic vapor flow is fed to the parts between the points A' and B' of the upper cylindrical can (5) at tilt angles between $\theta_1'$ to $\theta_2'$. The points A, B, A' and B' are selected as desired tilt angle ranges of the metallic vapor flows for the uniaxial magnetic anisotropy depending upon the evaporation base material. The tilt angles are preferably in the relations of $\theta_1=\theta_1'$ and $\theta_2=\theta_2'$, though the relations need not to be strictly considered. The points A, B, A', and B' can be selected to give substantially the same magnetic characteristics.

In one passing of the substrate, the tilt vapor depositions are resulted in two regions A–B and A'–B'. The tilt vapor deposition characteristics in both regions are substantially the same.

As described above, in the conventional process using the uniaxial cylindrical can, the vapor depositing area can not be increased because tilt angles are remarkably deviated from the desired tilt angle. On the contrary, in the process of the present invention, the vapor depositing area can be increased about double under maintaining the desired tilt angle range by using two cylindrical cans in the special manner. Even though the vapor deposition regions A–B and A'–B' can be limited to further desired ranges to be smaller. The total vapor depositing area can be larger than the vapor depositing area by the conventional process. Therefore, the magnetic recording medium having improved magnetic characteristics can be prepared in higher productivity at higher speed.

In FIG. 2, the apparatus using two cylindrical cans is shown. From a theoretical view-point, more cans can be used to maintain the desired tilt vapor deposition condition to provide larger vapor depositing area. However, in practice, it is usual to use 2–4 by cylindrical cans from the practical viewpoints such as a vacuum tank capacity, a stability of the running system, a vaporized metal amount and a metallic vapor flow rate.

The movable partition (12') shown in FIG. 2 can be replaced by a partition having variable width opening ports depending upon the number of the cans so as to control respectively the tilt angles of the metallic vapor flow to optimum tilt angles by the control of the widths.

It is clearly found that the tilt angle conditions are decided in view of relative positions of the cylindrical cans to the evaporation base source, relative arrangements of the cylindrical cans, and diameters of the cans. These factors for the design of the apparatus can be selected by a person skilled in the art to attain the desired tilt vapor deposition condition.

The present invention will be illustrated by certain examples and references which are provided for purposes of illustration only and are not intended to be limiting the invention.

EXAMPLE 1

Each magnetic recording media was prepared under the following condition in an apparatus shown in FIG. 2, by using an evaporation base material of cobalt-nickel alloy of Co:Ni of 80:20 by weight and depositing it on a polyethyleneterephthalate substrate having a thickness of 12 μm in a tilt vapor deposition.

| | |
|---|---|
| Vacuum in chamber (10): | $1 \times 10^{-2} - 1 \times 10^{-3}$ Torr |
| Vacuum in chamber (11): | $1 \times 10^{-5} - 1 \times 10^{-6}$ Torr |
| Diameter of cylindrical can (5), (6): | 200 mm |
| Horizontal projected distance of cylindrical can: | 50 mm |
| Substrate running speed: | 40 cm/min. |
| Can temperature: | 70–80° C. |
| Vapor deposition rate: | 2,800 A/min. |
| Tilt angle $\theta_1$, $\theta_1'$: | 60 degree |
| Tilt angle $\theta_2$, $\theta_2'$: | 80 degree |

In said condition, the movable partition (12') was set so that the metallic vapor flow did not reach to the can (5). The resulting sample is referred to as Sample A.

The movable partition (12') was shifted so that the metallic vapor flow reached to both of the can (5) and the can (6). The resulting sample is referred to as Sample B.

Characteristics of Samples A and B are measured. The results are as follows.

| Sample | A | B |
|---|---|---|
| Thickness of magnetic layer (μm) | 0.06 | 0.10 |
| Magnetic characteristics: | | |
| (VSM-III type applied magnetic field 5,000 Oe) | | |
| Coercive force (Oe): | 640 | 900 |
| Residual magnetic flux density(gauss) | 7,000 | 8,500 |
| Squareness (Br/Bm) | 0.95 | 0.95 |
| Electromagnetic conversion characteristics * | | |
| Noise level (dB) | 0.0 | −2.0 |
| Sensitivity (333Hz) (dB) | 0.0 | +3.0 |

* The electromagnetic conversion characteristics were measured by a commercial cassette tape recorder. The noise level was measured at a tape running speed of 4.75 cm/sec. in high position.

As it is clearly found in the table, the thickness of the magnetic layer in the present invention is about double to that of the conventional process. In the magnetic characteristics, both of the coercive force and the residual magnetic flux density in the present invention are remarkably improved.

In the electromagnetic conversion characteristics, the noise level in the present invention is improved for 2.0 dB and the sensitivity in the present invention is improved for 3.0 dB.

In accordance with the present invention, both of the productivity and the quality are remarkably improved.

EXAMPLE 2

In accordance with the process of Example 1 except using iron as the evaporation base material, each metallic vapor deposition was carried out. As the same manner, Samples A' and B' were prepared and as the same manner, characteristics of Samples A' and B' were measured. The results are as follows.

| Sample | A' | B' |
|---|---|---|
| Thickness of magnetic layer (μm) | 0.05 | 0.08 |
| Magnetic characteristics: | | |
| Coercive force (Oe): | 530 | 690 |
| Residual magnetic flux density(gauss) | 6,000 | 7,000 |
| Squareness (Br/Bm): | 0.90 | 0.90 |
| Electromagnetic conversion characteristics: | | |
| Noise level (dB): | 0.0 | −1.5 |
| Sensitivity (dB): | 0.0 | +2.0 |

As it is clearly found from the table, the thickness, the magnetic characteristics and the electromagnetic conversion characteristics of Sample B' repared by the two can system of the present invention are remarkably improved over those of the Sample A' prepared by the one can system of the conventional process.

As described above, in accordance with the process of the present invention, the disadvantage of the tilt vapor deposition in the conventional process for preparing the thin metallic layer type magnetic recording medium especially the low productivity is improved and the qualities as the magnetic characteristics and the electromagnetic conversion characteristics are also improved to contribute for a practical industrial operation of the tilt vapor deposition.

What is claimed as new and desired to be secured by Letters Patent of the United States is:

1. A process for preparing a magnetic recording medium by a tilt vapor deposition of magnetic particles on a substrate, said process comprising:
   positioning a source of magnetic particle vapor within an evacuated housing;
   positioning a first cylindrical can in said housing such that the circumferential surface of said can is in opposed relationship to said source;
   positioning a partition having an aperture between said source and said first can;
   locating said aperture such that lines extending from said source intersect said circumferential surface of said first can along an arc so as to form acute angles with a normal to the point of said intersection, said angles formed by said arc consisting of the angles between 60 and 85 degrees;
   positioning a second cylindrical can in said housing such that the circumferential surface of said second can is in opposed relationship to said source;
   locating said second can on the side of said first can opposite said source such that lines extending from said source are limited by said partition and said first can to intersect said circumferential surface of said second can along an arc so as to form acute angles to a normal to the point of intersection, said angles formed by said arc consisting of the angles between 60 and 85 degrees; and
   heating said source such that vapors from said source intersect said first and second cans at said acute angles.

* * * * *